United States Patent [19]
Samuel et al.

[11] 3,825,025
[45] July 23, 1974

[54] TRANSDUCER DEVICES AND APPARATUS INCLUDING SUCH DEVICES

[75] Inventors: Duncan Roy Samuel; Donald Fergus Moore, both of Cardiff, Wales

[73] Assignee: Radun Controls Limited, Pontypridd, Glamorgan, Wales

[22] Filed: July 6, 1972

[21] Appl. No.: 269,366

[30] Foreign Application Priority Data
July 9, 1971  Great Britain .................... 32422/71

[52] U.S. Cl. ............................ 137/392, 73/290 V
[51] Int. Cl. ...................... F16k 21/18, G01f 23/28
[58] Field of Search .......... 73/290 V, 290 R, 304 R; 137/386, 392; 340/244 R

[56] References Cited
UNITED STATES PATENTS

| | | | |
|---|---|---|---|
| 2,808,581 | 10/1957 | Finday | 340/244 R |
| 2,883,861 | 4/1959 | Van Valkenburg et al. | 73/290 V |
| 3,010,318 | 11/1961 | Mongan | 73/290 V |
| 3,223,964 | 12/1965 | Stadlin | 137/386 X |
| 3,326,042 | 6/1967 | Ross et al. | 73/290 V |

Primary Examiner—Richard C. Queisser
Assistant Examiner—Frederick Shoon
Attorney, Agent, or Firm—Sughrue, Rothwell, Mion, Zinn & Macpeak

[57] ABSTRACT

The invention provides a liquid sensing transducer comprising two spaced apart piezo-electric elements. An oscillator imparts ultrasonic vibrations to one element. The second element responds to these vibrations in dependence on the amount of liquid between the elements. The invention includes level gauge including the transducer, means for lifting and lowering the transducer, and control means for said last mentioned means responsive to the signal from the transducer to effect movement of the transducer to bring said signal to a value indicative of the presence of a given amount of liquid in said gap. The transducer can also, according to the invention, be made to control the level of liquid in a container. A number of transducers can be arranged one above the other to give on-off liquid level indication.

6 Claims, 5 Drawing Figures

TRANSDUCER DEVICES AND APPARATUS INCLUDING SUCH DEVICES

BACKGROUND OF THE INVENTION

This invention relates to a liquid level transducer that can be used to provide an electrical signal the magnitude of which is dependent on the degree of immersion of the transducer. The invention takes advantage of the fact that quartz and various piezo-electric ceramics have the property of vibrating if a varying electrical signal is applied and, conversely, if mechanically vibrated, the materials will produce a varying electrical signal.

The invention is further dependent on the appreciation that vibration, in particular of ultrasonic character, is transmitted more effectively through liquid than through a gas.

SUMMARY OF THE INVENTION

The transducer according to the invention comprises a transducer sensing the presence of liquid and comprising: a first and a second piezo-electric element; means mounting the piezo-electric elements in spaced apart relation and defining a gap therebetween which is accessible to ambient fluid; an oscillator to vibrate the first of said elements; and means to provide a signal dependent on the response of the second of said elements to the vibrations of the first element, the vibrations from the first piezo-electric element being transmitted through the fluid in the gap to the second element with the response of the second element and hence said signal being dependent of the amount of liquid in the gap.

The invention is also concerned with apparatus incorporating the transducer above defined, for example liquid level gauges and means to maintain a predetermined level of liquid in a container.

The invention will be further described with reference to the accompanying drawings.

DESCRIPTION OF THE PREFERRED EMBODIMENTS

Figure 1A:
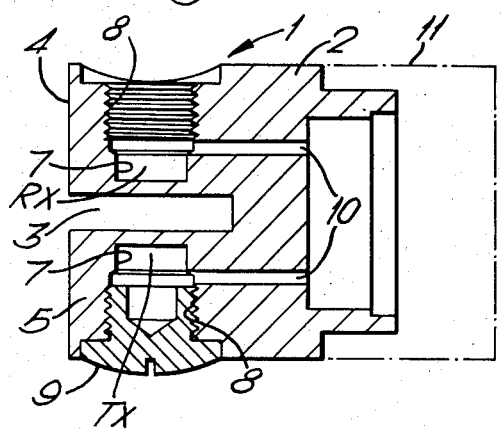
FIG. 1A is a diagrammatic axial section of a transducer head.
Figure 1B:
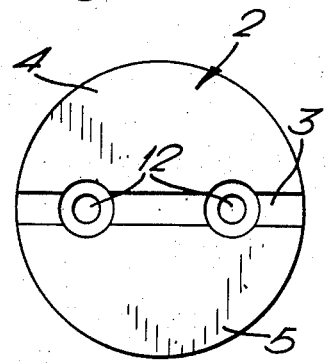
FIG. 1B is an end view of the head seen in the direction of the arrow B in FIG. 1A.

Referring to FIGS. 1A and 1B, the transducer head there shown and designated generally 1 comprises a stainless steel body 2 which is generally cylindrical and is formed with an axial slot 3 from the lower end. The body thus has a pair of similar limbs 4, 5 and a gap between them open to ambient fluid. The limbs 4, 5 are bored and counter-bored from the outside on an axis perpendicular to the plane of the slot 3, as shown at 7, 7, 8, 8, and the counterbores are threaded to receive closures 9, of which only one is shown in position. Similar piezo-electric ceramic discs Tx, Rx of modified lead zirconate-titanate material are mounted in the bores 7 and held in position by the closures 9. If desired a disc of stainless steel can be placed between the ceramic discs and the closures. Bores 10 are formed parallel to the axis of the body to bring electrical leads from the ceramic discs Tx, Rx to the interior of a container 11 shown in chain-line outline which contains some of the electronic circuitry associated with the head and is fixed to the body 2 by screws (not shown) passing through holes 12. The ceramic disc designated Tx is connected to an electrical oscillator which causes it to vibrate mechanically. The frequency of these vibrations may be varied according to the application but will normally be within the range 50 KHz. to 10 MHz., although the frequency range is not limited to these values. The mechanical vibrations set up an ultrasonic sound beam substantially at right angles to the face of the disc. This beam has to travel across the gap 3 in the metal body 2 and, if air or gas is present in this gap, the ultrasonic beam is greatly attenuated. However, if there is liquid in this gap, the attenuation of the beam is very small and it will travel across the gap and impinge on the ceramic disc Rx causing it to vibrate mechanically and thereby generate an electrical signal. Varying the depth of immersion of the transducer in the liquid over a distance equal to the diameter of the ceramic discs will cause the magnitude of the ultrasonic beam reaching the disc Rx to vary between substantially zero (maximum attenuation with least immersion) to maximum (minimum attenuation with greatest immersion) and this will result in a proportional variation in the electrical signal generated.

By using suitable detection equipment (as will be described), a very small change of immersion of the transducer head can be detected as a corresponding change in the electrical signal generated by the disc Rx. This electrical signal is transmitted from the transducer to an electronic control unit where it may be compared with a reference signal and, for example, used to control a reversible motor as will be described.

Figure 2:
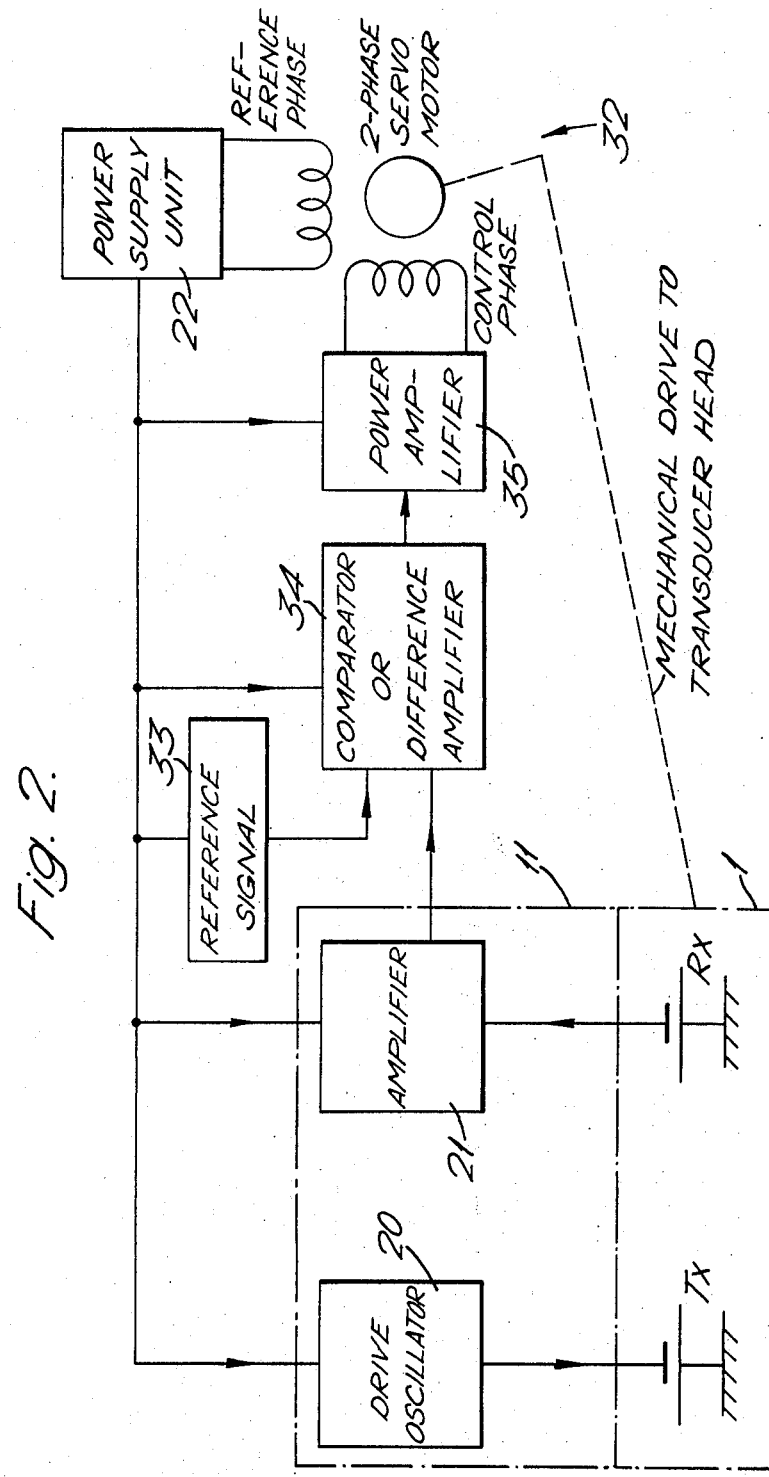
FIG. 2 is a block diagram showing the transducer head and circuit elements for use in a liquid level gauge.

FIG. 2 illustrates in block form an electronic sonic vibration generating and detection/amplification system employing the transducer head described and adapting it for use in a level gauge which will now be described below.

The transducer head 1 is shown diagrammatically in FIG. 2. The drive oscillator for the transmitter element Tx is designated 20; an amplifier receiving the signal from the receiving element Rx is shown at 21. These circuit elements are preferably enclosed in the container 11 mounted with the head. The remaining elements of the control unit and the power supply unit 22 therefor are remotely positioned and connected by a cable: they are described below.

Figure 3:
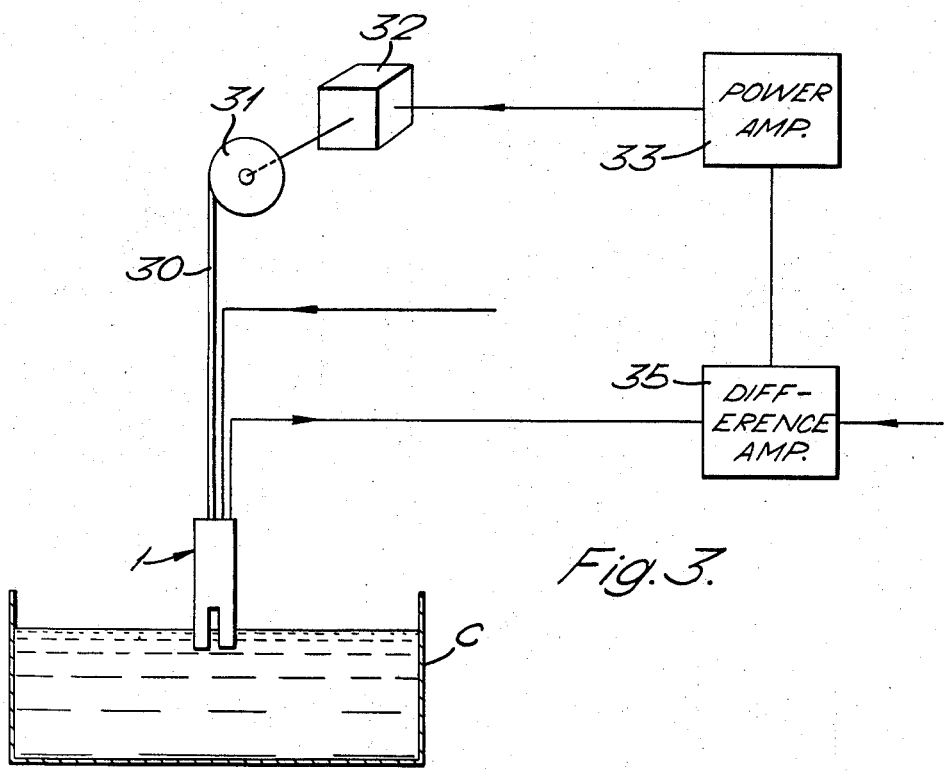
FIG. 3 is a further diagram illustrating the gauge.

As shown in FIG. 3, the transducer head 1 is suspended within a liquid storage vessel C, bore hole etc., by means of a suspension wire or tape 30, the other end of this being attached to a winch 31. The winch 31 in turn is mechanically driven by a reversible motor 32 controlled by the electronic control unit shown in FIG. 2. When the transducer 1 is above the liquid surface, the electrical output of the transducer is essentially zero. A reference signal generated in the electronic control unit by circuit elements designated 33 is fed with the transducer output signal to a comparator of difference amplifer 34 which produces an error signal to operate the reversible drive motor 32 through power amplifier 35 so that it drives the winch 31 in the appropriate direction to lower the transducer towards the liquid surface. When the transducer 1 enters the liquid, an electrical signal is produced by the transducer which is fed to the electronic control unit. This signal is of opposite polarity or phase to the internal reference signal and is arranged to oppose this reference signal. When a predetermined penetration of the transducer 1 in the liquid is reached, the transducer signal will equal the reference signal and the net output to the reversible motor 32 will be zero causing the transducer to stop at this particular penetration into the liquid, where it will be maintained as long as the liquid level is held constant. If the liquid level falls, the process will be repeated until balance is once more restored at the same penetration. Also, provided that the liquid level is changing at a rate no greater than the rate of lowering obtainable from the motor and winch, the transducer 1 will follow the liquid surface maintaining the penetration substantially at the constant amount. If the liquid level rises, the transducer 1 will be immersed to a greater extent resulting in the output signal increasing and exceeding the reference signal in the electronic control unit. This will cause the reversible motor 32 to be operated so that it drives the winch 31 in the appropriate direction to raise the transducer 1 until the equilibrium penetration is restored when the output signal from the transducer is once more equal to the reference signal in the electronic control unit. To facilitate the use of the transducer with conventional electronic amplifers, the design of the transducer is such that the electrical output signal is proportional to the penetration of the transducer in the liquid over the operational signal range. The rotation of the electric motor and winch may be used as a direct analogue of the actual level change.

The level gauge described can be used in liquid storage tanks or vessels, boreholes or any other means of containing a liquid. The liquid can be of any kind, irrespective of whether or not it is electrically conductive. Variations in the physical properties of the liquid such as density, dielectric constant etc. are irrelevant to the correct operation of the transducer. Similarly, variations in temperature or pressure within the liquid have no effect upon the operation. In instances where the liquid has a foam or froth blanket upon the surface, the transducer can be arranged to respond to either the foam or froth surface level or to the actual liquid level as required. This is particularly useful for the brewing and the petro-chemical industries.

The transducer can be made to respond to liquid flowing over it or it can be located at a predetermined height within a vessel and will produce an electrical signal when the liquid level rises sufficiently to partially immerse the transducer. On falling liquid level, the converse will apply and the device can therefore be used as a high or low level detector.

Figure 4:
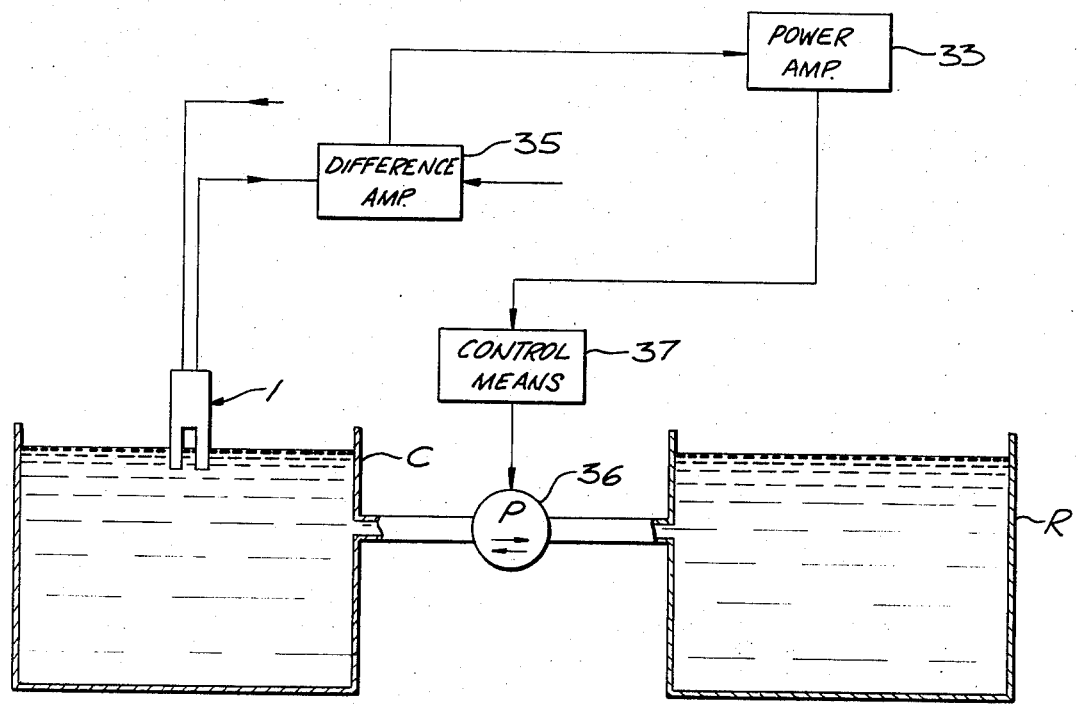
FIG. 4 is a block diagram showing the transducer in a system for maintaining a predetermined liquid livel in a container.

Instead of having the transducer control a winch as shown in FIG. 3 to follow changing liquid level, the control function can be applied to a pump 36 or valve via a control means 37 to introduce or withdraw liquid from a reservoir R and maintain a constant level in the container C, as shown in FIG. 4.

A fixed level gauge can be made by arranging a series of transducers as above described one above the other, each giving an "on-off" signal.

What is claimed is:

1. A transducer for sensing the presence of liquid, comprising:
   a. first and second piezo-electric elements,
   b. a generally cylindrical, solid metallic element having a slot accessible to ambient liquid formed in one end on a plane including the axis of the cylindrical element to provide a pair of similar, opposed limbs defining said slot between them, the first and second piezo-electric elements being individually mounted in the limbs facing each other across the slot,
   c. an oscillator for vibrating the first piezo-electric element, and
   d. means for providing a signal dependent upon the response of the second piezo-electric element to the vibrations of the first piezo-electric element, the vibrations from the first piezo-electric element being transmitted through the liquid in the slot to the second piezo-electric element with the response of the second piezo-electric element and hence said signal being dependent upon the amount of liquid in the slot.

2. Apparatus comprising a container and means to maintain liquid at a predetermined level therein, comprising a transducer according to claim 1 disposed at said predetermined level, means to move liquid between the container and an ambient space, and control means for said last mentioned means responsive to the signal from the transducer and set to effect movement of liquid into or out of the container to bring said signal to a value indicative of the presence of a given amount of liquid in said gap.

3. A transducer as defined in claim 1 wherein the oscillator is mounted in a housing directly on the cylindrical element.

4. A transducer as defined in claim 1 wherein the cylindrical element is vertically oriented and the signal is therefor substantially proportional to the level of the liquid in the slot.

5. A liquid level sensing gauge, comprising:
   a. a transducer comprising:
      1. first and second piezo-electric elements,
      2. means mounting the piezo-electric elements in spaced apart relation and defining a gap therebetween which is accessible to ambient liquid,
      3. an oscillator for vibrating the first piezo-electric element, and
      4. means for providing a signal dependent upon the response of the second piezo-electric element to the vibrations of the first piezo-electric element, the vibrations from the first piezo-electric element being transmitted through the liquid in the gap to the second piezo-electric element with the response of the second piezo-electric element and hence said signal being dependent upon the amount of liquid in the gap,
   b. means for lifting and lowering the transducer, and
   c. control means for said lifting and lowering means responsive to the signal from the transducer for effecting movement of the transducer to bring said signal to a value indicative of the presence of a given amount of liquid in said gap.

6. A liquid level sensing gauge comprising:
   a. a transducer comprising:
      1. first and second piezo-electric elements, 2. means mounting the piezo-electric elements in spaced apart relation and defining a gap therebetween which is accessible to ambient liquid,
3. an oscillator for vibrating the first piezo-electric element, and
4. means for providing a signal dependent upon the response of the second piezo-electric element to the vibrations of the first piezo-electric element, the vibrations from the first piezo-electric element being transmitted through the liquid in the gap to the second piezo-electric element with the response of the second piezo-electric element and hence said signal being dependent upon the amount of liquid in the gap, b. a winch controlling a flexible element supporting said transducer, and
c. control means for the winch comprising:
  1. means for generating a reference signal corresponding to the presence of a given amount of liquid in said gap,
  2. means for comparing the signal from the transducer with the reference signal to generate an error signal, and
  3. means for effecting operation of the winch to move the transducer in a direction to minimize the error signal.

* * * * *